(12) United States Patent
Beygelzimer et al.

(10) Patent No.: US 7,890,449 B2
(45) Date of Patent: Feb. 15, 2011

(54) METHOD FOR PERFORMANCE BOTTLENECK DIAGNOSIS AND DEPENDENCY DISCOVERY IN DISTRIBUTED SYSTEMS AND COMPUTER NETWORKS

(75) Inventors: Alina Beygelzimer, White Plains, NY (US); Gaurav Chandalia, Amherst, MA (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/853,986

(22) Filed: Sep. 12, 2007

(65) Prior Publication Data
US 2009/0070280 A1 Mar. 12, 2009

(51) Int. Cl.
*G06N 5/00* (2006.01)
(52) U.S. Cl. .......................................... 706/48; 706/45
(58) Field of Classification Search .................. 706/48, 706/45
See application file for complete search history.

(56) References Cited

PUBLICATIONS

Chen, et al., Tomography-based Overlay Network Monitoring, IMC'03, Oct. 29, 2003, pp. 216-221.*
S. Klinger et al., "A Coding Approach to Event Correlation", Proceedings of the Fourth International Symposium on Integrated Network Management IV, p. 266-277, 1995.
R. Castro et al., "Network Tomography: Recent Developments", Statistical Science, 19(3): 499-517, 2004.
Non-negative Matrix Factorization with Sparseness Constraints, [online]; [retrieved Aug. 30, 2007]; retrieved from the Internet http://www.cs.helsinki.fi/u/phoyer/papers/pdf/NMFscweb.pdf.
Adaptive Diagnosis in Distributed Systems, [online]; [retrieved Sep. 12, 2007]; retrieved from the Internet http://researchweb.watson.ibm.com/people/r/rish/papers/IEEE.pdf.

* cited by examiner

*Primary Examiner*—Wilbert L Starks, Jr.
(74) *Attorney, Agent, or Firm*—Cantor Colburn LLP; Preston Young

(57) ABSTRACT

A method for performance bottleneck diagnosis and dependency discovery in distributed systems and computer networks includes receiving a real-valued end-to-end measurement matrix, a number of end-to-end measurements, a number of time points, a number of network components, a loss function, and a plurality of constraints on output matrices. The method further includes learning basic output matrices by best approximation of a transpose of the real-valued end-to-end measurement matrix, selecting a first threshold based on a real-valued mixing-weights matrix and a second threshold based on a real-valued delay matrix, converting the real-valued mixing-weights matrix and the real-valued delay matrix into respective binary matrices using the first threshold and the second threshold, and returning the real-valued mixing-weights matrix, the real-valued delay matrix, and the respective binary matrices to represent bottlenecks dependencies of the distributed system or computer network.

5 Claims, 2 Drawing Sheets

METHOD FOR PERFORMANCE BOTTLENECK DIAGNOSIS AND DEPENDENCY DISCOVERY IN DISTRIBUTED SYSTEMS AND COMPUTER NETWORKS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

This invention generally relates to distributed systems and computer networks. Specifically, this invention relates to diagnosing performance bottlenecks and discovering dependencies in distributed systems and computer networks.

2. Description of Background

Monitoring and diagnosis of distributed computer systems and networks is an important issue in systems management that becomes increasingly challenging as size and complexity of such systems increases. Given the heterogeneous, decentralized, and often non-cooperative nature of typical large-scale networks, it is impractical to assume that all statistics related to an individual system's components (e.g., links, routers, and application-layer components) can be collected for monitoring purposes. However, other type of measurements, including end-to-end transactions (or probes), may be relatively easier to obtain.

Consider diagnosing performance problems in a distributed system given end-to-end performance measurements provided by test transactions, or probes. For example, a ping is an example of a probe, and the corresponding performance metric is the end-to-end delay. The end-to-end delay is a combination of delays at all internal components of the system that the probe traveled through. Similarly, response time of an application-layer probe (e.g., http access, database access, etc) is a combination of delays at all (i.e., both software and hardware) components that the probe traveled through. Conventional techniques for problem diagnosis such as, for example, codebook and network tomography typically assume a known dependency matrix (or, in case of network diagnosis, routing matrix) that describes how each probe depends on the system's components.

However, obtaining dependency information may be too costly or infeasible in many situations. For example, network topology and routing information may be unavailable due to non-cooperative administrative domains blocking access to topology discovery tools, components that affect probe's performance may be hard to discover (e.g., low level network elements or high-level application components such as particular set of database tables crucial for transaction performance), maintaining up-to-date information about dynamically changing routing (e.g., in wireless and mobile networks) may get costly, and constructing dependency matrices for application-level transactions is typically quite a laborious process requiring expert knowledge of system components that may affect a probe's performance.

SUMMARY

A method for performance bottleneck diagnosis and dependency discovery in distributed systems and computer networks includes receiving a real-valued end-to-end measurement matrix, a number of end-to-end measurements, a number of time points, a number of network components, a loss function, and a plurality of constraints on output matrices. According to the method, a number of columns of the real-valued end-to-end measurement matrix is the number of time points, a number of rows of the real-valued end-to-end measurement matrix is the number of end-to-end measurements, the network components include all components included in a distributed system or computer network, the end-to-end measurements are end-to-end measurements across at least a portion of the network components, and the loss function is defined in terms of the output matrices. The method further includes learning basic output matrices by best approximation of the real-valued end-to-end measurement matrix subject to the loss function and the constraints on the output matrices. According to the method, the basic output matrices include a real-valued mixing-weights matrix and a real-valued delay matrix. The method further includes selecting a first threshold based on the real-valued mixing-weights matrix and a second threshold based on the real-valued delay matrix, converting the real-valued mixing-weights matrix and the real-valued delay matrix into respective binary dependency and bottleneck matrices using the first threshold and the second threshold, and returning the real-valued mixing-weights matrix, the real-valued delay matrix, and the respective binary dependency and bottleneck matrices.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains an exemplary embodiment, together with advantages and features, by way of example with reference to the drawings.

DETAILED DESCRIPTION

According to an exemplary embodiment, dependency discovery and problem diagnosis may be performed simultaneously and may be performed in accordance with a methodology analogous to a blind source separation (BSS) problem aimed at reconstructing both unobserved input signals and mixing-weights matrix from combined signals received at a given collection of points.

An example of a BSS problem is the "cocktail party problem". In the cocktail party problem, N speakers are present in a room with M microphones. Generally, the problem includes reconstructing what each of the N speakers has said (e.g., N signals) and how close the M microphones are located to each of the N speakers (M×N mixing matrix).

The BSS problem may be solved by a matrix factorization approach. For example, given a M×T matrix of end-to-end probe observations Y, where M is the number of probes and T is the number of time points, the problem may be solved by finding two matrices A and X that provide the best possible approximation of Y as a factorization Y'=A*X. In this example, A corresponds to the M×N dependency/routing matrix, and X corresponds to the N×T signal matrix containing reconstructed delays at each component and at each time point. With regards to composition of matrix A, rows correspond to probes and columns correspond to system components. With regards to composition of matrix X, rows correspond to system components and columns correspond to the time points.

Furthermore, the delay experienced by a transaction at each component may be an unobserved "signal", the unknown dependency/routing matrix may be a mixing-weights matrix, and the observed end-to-end performance may be an output signal (e.g., corresponding to a "microphone" in the above example of the cocktail party problem).

Figure 1:
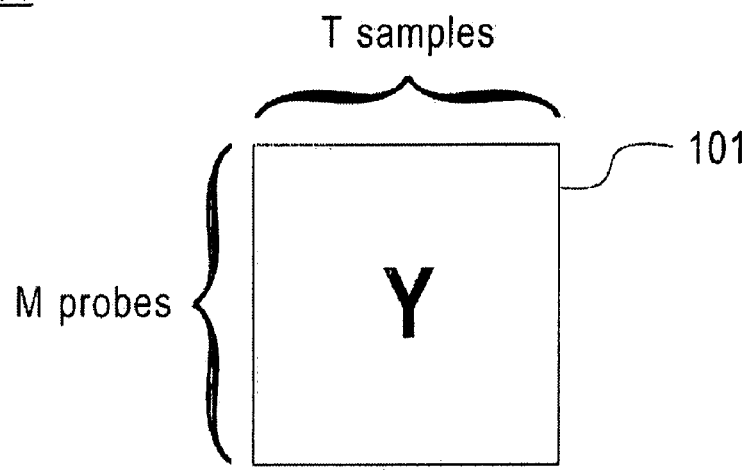
FIG. 1 illustrates exemplary matrices, according to an exemplary embodiment.
Figure 1:
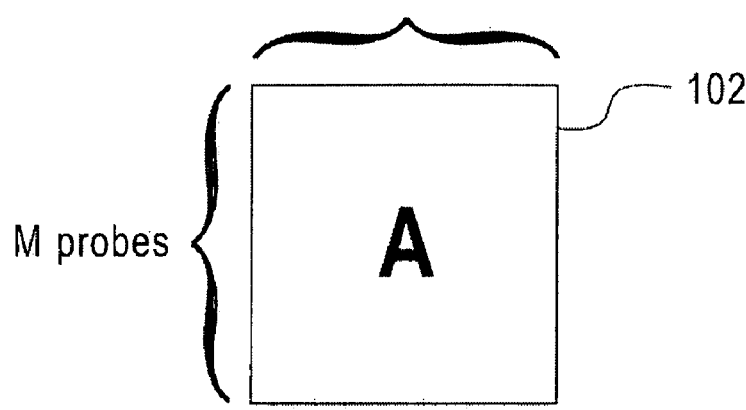
Figure 1:
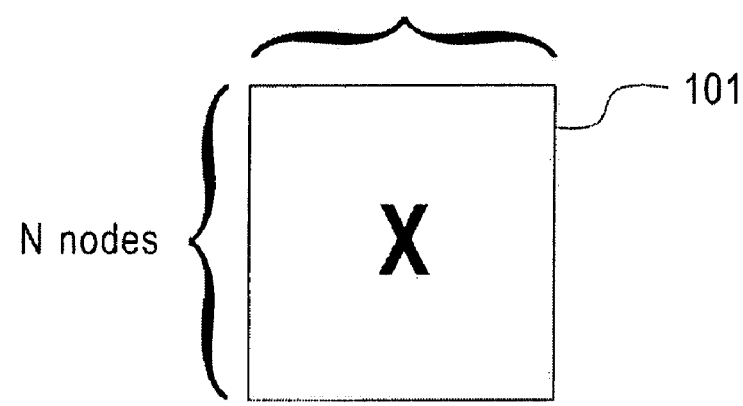

Turning to FIG. 1, exemplary matrices 100 are illustrated. The exemplary matrices 100 include "Y" matrix 101, "A" matrix 102, and "X" matrix 103. According to an exemplary embodiment, the "Y" matrix 101 is a real-valued matrix of end-to-end measurements of a distributed system or computer network. Thus, the "Y" matrix 101 contains T columns, where T is the number of samples taken in an end-to-end measurement. Further, the "Y" matrix 101 contains M rows, where M is the number of end-to-end measurements.

With regards to the "A" and "X" matrices 102 and 103, it is noted that the "A" and "X" matrices 102 and 103 correspond to the dependency/routing matrix (or mixing-weights matrix) and delay matrix described above with reference to the cocktail party problem. Thus, the "A" matrix 102 corresponds to the M×N dependency/routing matrix and X corresponds to the N×T signal matrix containing reconstructed delays at each component and at each time point. With regards to composition of the "A" matrix 102, rows correspond to probes and columns correspond to system components. With regards to composition of the "X" matrix 103, rows correspond to system components and columns correspond to the time points. According to an exemplary embodiment, the two matrices "A" and "X" are calculated in a method as is described hereinafter.

Figure 2:
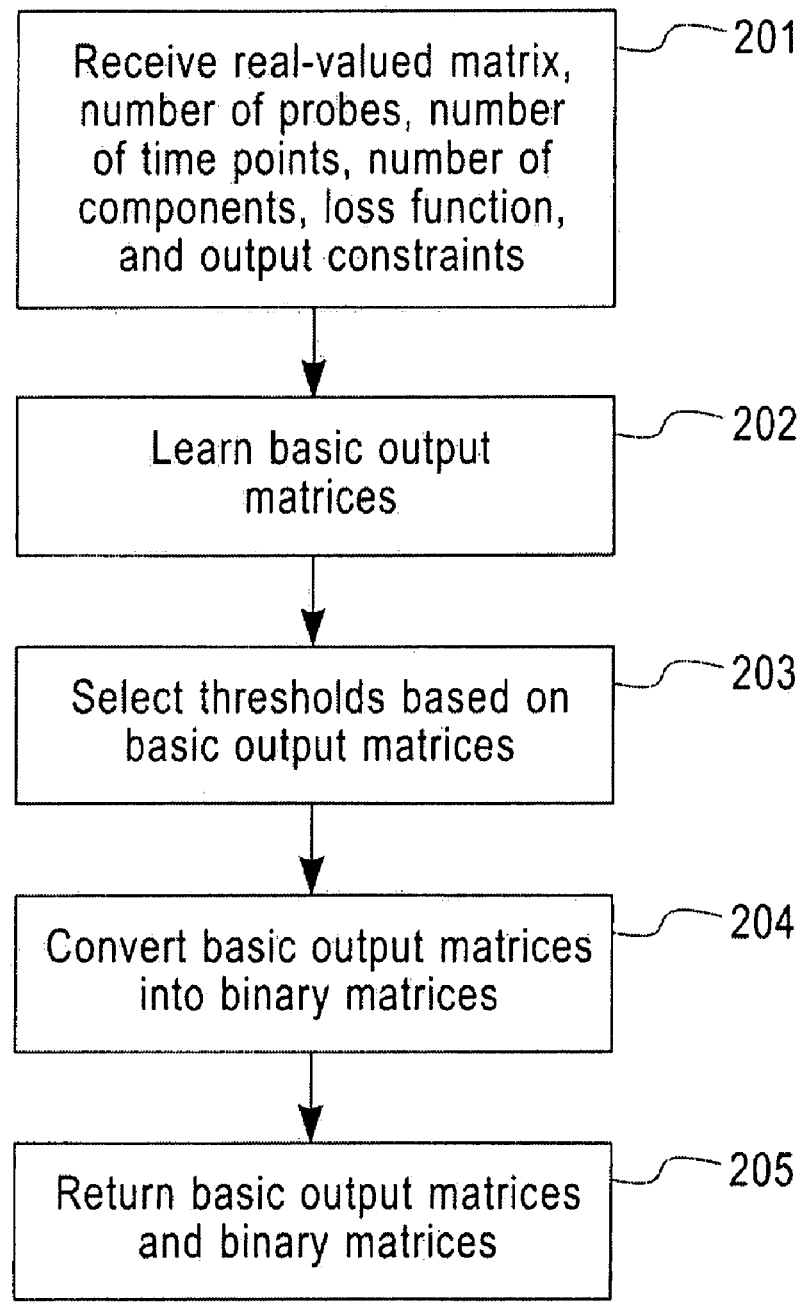
FIG. 2 a flowchart of a method for performance bottleneck diagnosis and dependency discovery in distributed systems and computer networks, according to an exemplary embodiment.

Turning to FIG. 2, a flowchart of a method (200) for performance bottleneck diagnosis and dependency discovery in distributed systems and computer networks is illustrated. According to the method 200, a real-valued matrix is received at block 201. The real-valued matrix may correspond to the "Y" matrix 101 described above. Further, the number of probes (i.e., end-to-end transactions) and time points (i.e., number of samples) is received at block 201. It is noted that because the "Y" matrix 101 is a matrix of T columns and M rows, receipt of only the "Y" matrix should also result in receipt of the number of probes and time points as these values correspond to the "Y" matrix's dimensions. Additionally, a number of components in the distributed system/computer network, a loss function for the distributed system/computer network, and output constraints are received at block 201. The number of components may be referred to as the number of nodes. Also, the loss function may be a function L(Y', Y) and the output constraints may be constraints on output matrices (e.g., the matrices "A" and "X" described above) of the method 200.

Turning back to FIG. 2, the method 200 further includes learning basic output matrices (e.g., the matrices "A" and "X" described above) at block 202. As described hereinbefore, the two matrices A and X should be calculated such that the two matrices provide the best approximation of the Y matrix as a factorization Y'=A*X. The calculation should be subject to the loss function and the output constraints. More specifically, in order to learn the matrices A and X, a constrained optimization problem that minimizes the reconstruction error, or loss function L (Y, Y'), such as sum-squared loss, should be found.

The optimization may be constrained because both the delay matrix (i.e., the X matrix) and the dependency matrix (i.e., the A matrix) have specific properties (e.g., delays are non-negative and the number of simultaneous bottlenecks is typically small). It is noted that the dependency matrix is typically sparse because, for example, a system/network probe often follows the shortest route. Thus, the number of components a network probe depends on is smaller than the total number of components.

With regards to learning the matrices A and X, a Sparse Non-Negative Matrix Factorization (SNMF) algorithm may be applied to the "Y" matrix to find an approximation Y'=A*X. It is noted that Y' (the transpose of matrix Y) may also be expressed as Expression 1, provided below:

$$Y' = \underset{Y''}{\operatorname{argmin}} \operatorname{Loss}(Y'', Y). \qquad \text{Expression 1}$$

Alternatively, other variants of the particular optimization problem and matrix-factorization algorithms may be used. These other variants include independent component analysis (ICA), sparse and nonnegative variants of ICA, principal component analysis (PCA), and singular value decomposition (SVD). It is noted that SVD is an underlying component of PCA. Furthermore, ICA includes reconstructing signals assuming they are mutually independent which may be an appropriate assumption regarding delays at different system's components. Moreover, such optimization techniques are closely related to probabilistic approaches to matrix factorization that may interpret the X matrix as random variables with some appropriate prior distribution P(X) and matrix A as a set of parameters that specify the conditional probability distribution P(A|X). These optimization techniques may also attempt to find maximum-likelihood parameters A and maximum-likelihood assignments to X. Block 202 therefore should be interpreted as including any the above techniques (e.g., SNMF, ICA, and/or PCA.SVD).

Turning back to FIG. 2, the method 200 further includes selecting thresholds based on the matrices A and X. For example, this may be performed by post-processing including appropriate thresholding in order to provide a means to reconstruct a binary dependency matrix A' from the real-valued mixing-weights matrix A, and a binary bottleneck-indicator matrix X' that corresponds to an appropriately thresholded matrix X.

The method 200 further includes selecting thresholds at block 203. The thresholds may include a threshold $t_1$ and a threshold $t_2$ calculated such that an appropriate binary matrix may be calculated from matrices A and X. Thus, the method 200 further includes converting the matrices A and X into binary matrices A' and X' in block 204.

For example, the binary matrix A' may be calculated by assigning a logical "1" to all entries of matrix A that exceed the threshold $t_1$. All other entries of A should be assigned a logical "0" to finalize the binary matrix A'. Similarly, the binary matrix X' may be calculated by assigning a logical "1" to all entries of matrix X that exceed the threshold $t_2$. All other entries of X should be assigned a logical "0" to finalize the binary matrix X'.

Turning back to FIG. 2, the method 200 returns the real-valued mixing-weights matrix A, the dependency matrix A' (binary), the bottleneck-indicator matrix X' (binary), and the real-valued delay matrix X at block 205. Thus, the method 200 provides simultaneous bottleneck diagnosis and dependency discovery through various calculation.

As described hereinbefore, an exemplary embodiment of the present invention provides an approach to bottleneck diagnosis and dependency discovery from end-to-end performance measurements in cases when the dependency (e.g., routing) information is unknown or only partially known, which provides advancement over the conventional art in network tomography. Moreover, the exemplary method may also discover not only slow components, but also components having high variance (e.g., jitter) in the probe response time. Discovery of jittery links, for example, is particularly important for voice over internet protocol (VoIP) networks. Note that discovery of jittery components is not considered in the common network tomography settings [2].

According to an exemplary embodiment, the method described hereinbefore may be implemented by a computer system or apparatus. Therefore, portions or the entirety of the method may be executed as instructions in a processor of the computer system. Thus, the present invention may be implemented, in software, for example, as any suitable computer program. For example, a program in accordance with the present invention may be a computer program product causing a computer to execute the example method described herein.

The computer program product may include a computer-readable medium having computer program logic or code portions embodied thereon for enabling a processor of a computer apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method for performance bottleneck diagnosis and dependency discovery in distributed systems and computer networks, in accordance with an exemplary embodiment of the present invention.

While an exemplary embodiment has been described, it will be understood that those skilled in the art, both now and in the future, may make various improvements and enhancements which fall within the scope of the claims which follow.

These claims should be construed to maintain the proper protection for the invention first described.

What is claimed is:

1. A method for performance bottleneck diagnosis and dependency discovery in distributed systems and computer networks, comprising:

receiving a real-valued end-to-end measurement matrix, a number of end-to-end measurements, a number of time points, a number of network components, a loss function, and a plurality of constraints on output matrices, wherein, a number of columns of the real-valued end-to-end measurement matrix is the number of time points, a number of rows of the real-valued end-to-end measurement matrix is the number of end-to-end measurements, the network components include all components included in a distributed system or computer network, the end-to-end measurements are end-to-end measurements across at least a portion of the network components, and the loss function is defined in terms of the output matrices;

learning basic output matrices by best approximation of a transpose of the real-valued end-to-end measurement matrix subject to the loss function and the constraints on the output matrices, wherein, the basic output matrices include a real-valued mixing-weights matrix and a real-valued delay matrix;

selecting a first threshold based on the real-valued mixing-weights matrix and a second threshold based on the real-valued delay matrix, wherein the first threshold and the second threshold are selected such that appropriate binary matrices are calculated from the real-valued mixing-weights matrix and the real-valued delay matrix;

converting the real-valued mixing-weights matrix and the real-valued delay matrix into the respective binary matrices using the first threshold and the second threshold; and returning the real-valued mixing-weights matrix, the real-valued delay matrix, and the respective binary matrices to represent bottlenecks and dependencies of the distributed system or computer network.

2. The method of claim 1, wherein the learning basic output matrices includes applying a sparse non-negative matrix factorization (SNMF) algorithm to the real-valued end-to-end measurement matrix.

3. The method of claim 1, wherein the respective binary matrices include:

a binary dependency matrix representing a binary conversion of the real-valued mixing-weights matrix, wherein the binary dependency matrix includes dependencies of the distributed system or computer network; and a binary bottleneck-indicator matrix representing a binary conversion of the real-valued delay matrix, wherein the binary bottleneck-indicator matrix includes bottlenecks of the distributed system or computer network.

4. The method of claim 3, wherein:

the converting the real-valued mixing-weights matrix includes assigning a logical one value to all entries of the real-valued mixing-weights matrix exceeding the first threshold and assigning a logical zero to all entries of the real-valued mixing-weights matrix not exceeding the first threshold to provide the binary dependency matrix; and the converting the real-valued delay matrix includes assigning a logical one value to all entries of the real-valued delay matrix exceeding the second threshold and assigning a logical zero to all entries of the real-valued delay matrix not exceeding the second threshold to provide the binary bottleneck-indicator matrix.

5. A computer-readable medium including computer instructions that, when executed on a host processor of a computer apparatus, directs the host processor to perform a method for performance bottleneck diagnosis and dependency discovery in distributed systems and computer networks including the computer apparatus, the method comprising:

receiving, at the computer apparatus, a real-valued end-to-end measurement matrix, a number of end-to-end measurements, a number of time points, a number of network components, a loss function, and a plurality of constraints on output matrices, wherein, a number of columns of the real-valued end-to-end measurement matrix is the number of time points, a number of rows of the real-valued end-to-end measurement matrix is the number of end-to-end measurements, the network components include all components included in a distributed system or computer network, the end-to-end measurements are end-to-end measurements across at least a portion of the network components, and the loss function is defined in terms of the output matrices;

learning basic output matrices by best approximation of a transpose of the real-valued end-to-end measurement matrix subject to the loss function and the constraints on the output matrices, wherein, the basic output matrices include a real-valued mixing-weights matrix and a real-valued delay matrix;

selecting a first threshold based on the real-valued mixing-weights matrix and a second threshold based on the real-valued delay matrix, wherein the first threshold and the second threshold are selected such that appropriate binary matrices are calculated from the real-valued mixing weights matrix and the real-valued delay matrix;

converting the real-valued mixing-weights matrix and the real-valued delay matrix into the respective binary dependency and bottleneck matrices using the first threshold and the second threshold; and returning, from the computer apparatus, the real-valued mixing-weights matrix, the real-valued delay matrix, and the respective binary dependency and bottleneck matrices.

* * * * *